(12) United States Patent
Kulesha

(10) Patent No.: US 9,260,176 B2
(45) Date of Patent: Feb. 16, 2016

(54) RETRACTABLE CARGO ROLLER SYSTEM

(75) Inventor: Richard L. Kulesha, Bear, DE (US)

(73) Assignee: The Boeing Company, Chicago, IL (US)

(*) Notice: Subject to any disclaimer, the term of this patent is extended or adjusted under 35 U.S.C. 154(b) by 1369 days.

(21) Appl. No.: 12/190,569

(22) Filed: Aug. 12, 2008

(65) Prior Publication Data
US 2010/0038206 A1    Feb. 18, 2010

(51) Int. Cl.
| | | |
|---|---|---|
| *B65G 13/12* | (2006.01) | |
| *B65G 67/20* | (2006.01) | |
| *B64C 1/20* | (2006.01) | |
| *B64D 9/00* | (2006.01) | |
| *B65G 13/06* | (2006.01) | |

(52) U.S. Cl.
CPC ... *B64C 1/20* (2013.01); *B64D 9/00* (2013.01); *B65G 13/065* (2013.01); *B65G 13/12* (2013.01); *B65G 67/20* (2013.01); *B64D 2009/006* (2013.01)

(58) Field of Classification Search
None
See application file for complete search history.

(56) References Cited

U.S. PATENT DOCUMENTS

| | | | | |
|---|---|---|---|---|
| 2,836,278 | A * | 5/1958 | Kindell | 193/42 |
| 3,243,029 | A * | 3/1966 | Oliver | B60P 1/52 |
| | | | | 193/35 SS |
| 4,823,927 | A | 4/1989 | Jensen | |
| 5,088,585 | A | 2/1992 | Lambert | |
| 6,193,043 | B1 * | 2/2001 | Langston et al. | 193/35 SS |
| 6,454,079 | B1 * | 9/2002 | Teramoto | B65G 23/30 |
| | | | | 198/334 |
| 6,834,758 | B2 | 12/2004 | Nguyen et al. | |
| 7,014,038 | B2 | 3/2006 | Leingang | |

* cited by examiner

*Primary Examiner* — Kavel Singh
(74) *Attorney, Agent, or Firm* — Parsons Behle & Latimer

(57) ABSTRACT

Roller modules have roller assemblies that are retractable below a cargo floor. Each module includes a housing, at least one roller for engaging cargo on the floor and, a mechanism mounting the roller on the housing for shifting movement between an extended position in which the roller extends above the floor for engaging cargo, and a retracted position in which the roller is disposed below the floor.

35 Claims, 5 Drawing Sheets

RETRACTABLE CARGO ROLLER SYSTEM

TECHNICAL FIELD

This disclosure generally relates to cargo handling equipment, and deals more particularly with a retractable cargo roller system for floors.

BACKGROUND

Transportation vehicles that carry cargo often have cargo area floors that may be specially constructed to facilitate cargo handling. For example, roller systems are sometimes used inside aircraft or container vessels to move palletized cargo. These roller systems may be integrated into the cargo area floor or into the container system, which may make it difficult to change the type of roller used in order to better suit a particular type of cargo. Also, at least a part of the roller system may be disposed above the surface of the cargo floor, resulting in obstructions that may impede the movement of certain types of cargo that are better suited for movement over a smooth, unobstructed floor.

Cargo roller systems exist that may be raised or lowered to suit particular types of cargos, but these systems may not have the capacity to lift heavy cargo loads, and are typically long and may not be reconfigurable. Roller systems are also known that may be removed entirely to provide a flat cargo surface, while some other existing roller systems must be flipped over in order to present a smooth cargo surface, free of obstructions.

Accordingly, there is a need for a cargo roller system that may be quickly retracted into a cargo floor in order to present a smooth cargo floor surface, substantially free of obstructions. There is also a need for a cargo roller system that is modular in construction, easily reconfigurable and is capable of lifting heavy cargo loads.

SUMMARY

In accordance with the disclosed embodiments, a retractable cargo roller system comprises roller modules mounted on beams that support a cargo floor. The modules and/or the rollers are easily reconfigurable to suit the particular needs of a cargo vehicle. Each module includes a set of rollers that may be extended above the surface of the floor by a hydraulic cylinder.

The use of roller modules results in a flat cargo floor substantially free of protruding rollers when no cargo is being loaded or when loading cargo that does not need a roller system. The hydraulic system lowers and raises the roller assembly, and when lowered, the cargo and/or a pallet the rests on the cargo floor, rather than on the rollers, which may allow a more secure tie down of the cargo. When needed, the hydraulic system may be used to raise the cargo in preparation for movement, particularly where it may be necessary gain access beneath the cargo using a forklift or the like.

The modular nature of the cargo roller system allow it to be selectively implemented within a cargo bay. In other words, the entire floor may not need to be equipped with the roller modules, but rather only a small portion of the floor may be treated. The cargo floor system may also be easily modified to increase the cargo lifting capacity without changing hydraulic pressure by switching out the actuation cylinders in the modules to one of a larger size. Maintenance and repair of the roller systems is enhanced by the fact that the removal of only two bolts may be required to remove a lift mechanism assembly in the module. The roller assembly may also be replaced by removing only two bolts. Each of the hydraulic actuation cylinders may be removed by removing only two bolts and each roller may be removed, replaced or changed by removing a single bolt for each roller, thus facilitating quick change and/or repair, since the assembly does not have to be removed from the structure.

According to one disclosed embodiment, a retractable roller module for a cargo floor comprises: a housing; at least one roller for engaging cargo on the floor; and, a mechanism mounting the roller on the housing for shifting movement between an extended position in which the roller extends above the floor for engaging cargo and a retracted position in which the roller is disposed below the floor. The mounting mechanism includes arms forming a scissors assembly and a motor connected to the arms for displacing the scissors assembly.

According to another disclosed embodiment, a roller module for use in a cargo floor comprises: at least one roller for engaging cargo; and, means for shifting a roller between a retracted position disposed beneath the floor and an extended, cargo engaging position disposed above the floor.

According to a further embodiment, a cargo floor system for aircraft comprises: a floor; openings in the floor; and, a plurality of roller modules beneath the floor and each aligned with one of the openings in the floor, each of the roller modules including at least one roller extendable into engagement with the cargo and retractable beneath the floor. The cargo floor system may further comprise beams beneath the floor for supporting the floor, wherein the modules are mounted on and supported by the beams. The beams may extend generally parallel to each other and each include a web extending generally transverse to the floor. Each of the roller modules has opposite ends respectively amounted on the webs of adjacent ones of the beams. The cargo system may further include a plurality of covers for respectively covering the floor openings when the rollers are retracted beneath the floor, in order to provide a smooth cargo floor surface.

Embodiments of the disclosure satisfy the need for a retractable cargo roller system comprising roller modules that are supported on beams beneath the floor and may be reconfigured to suit differing cargo applications.

Other features, benefits and advantages of the disclosed embodiments will become apparent from the following description of embodiments, when viewed in accordance with the attached drawings and appended claims

BRIEF DESCRIPTION OF THE ILLUSTRATIONS

DETAILED DESCRIPTION

Figure 1:
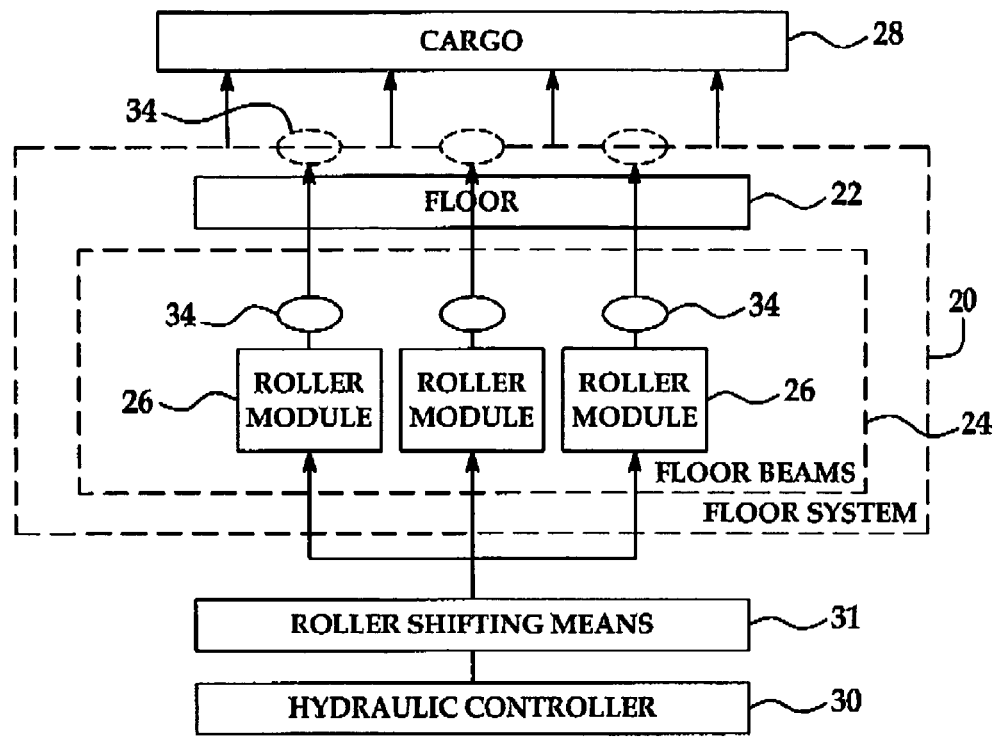
FIG. 1 is a functional block diagram of a cargo floor system.

Referring first to FIG. 1, the disclosed embodiments generally relate to a cargo floor system 20 for supporting cargo 28. The cargo floor system 20 may form a part of any of a variety types of vehicles or vessels including, for example and without limitation, an aircraft, a truck or a container vessel.

The cargo floor system 20 includes a cargo floor 22 that is supported by underlying floor beams 24. A plurality of roller modules 26 are disposed beneath the floor 22 and are supported on adjacent ones of the floor beams 24. As will be discussed in more detail below, each of the roller modules 26 includes one or more retractable rollers 34 that may be extended above the floor 22 in order to engage and facilitate movement of the cargo 28. Retraction and extension of the rollers 34 is controlled by a hydraulic controller 30 and a roller shifting means 31 that will be described later in more detail.

Referring now to FIGS. 2-5, the floor 22 is supported on floor beams 24 that extend generally parallel to each other. Each of the beams 24 includes upper and lower caps 38, 40 respectively, connected by a web 36 that extends generally transverse to the floor 22. The beams 24 may be constructed of metal, composites or a combination of metal and composite materials. The floor 22 includes one or more openings 35 therein that overlie and are generally coextensive with each of the roller modules 26. The roller modules 26 are attached to the webs 36 and/or caps 38, 40 of adjacent ones on the beams 24.

Figures 2, 3:
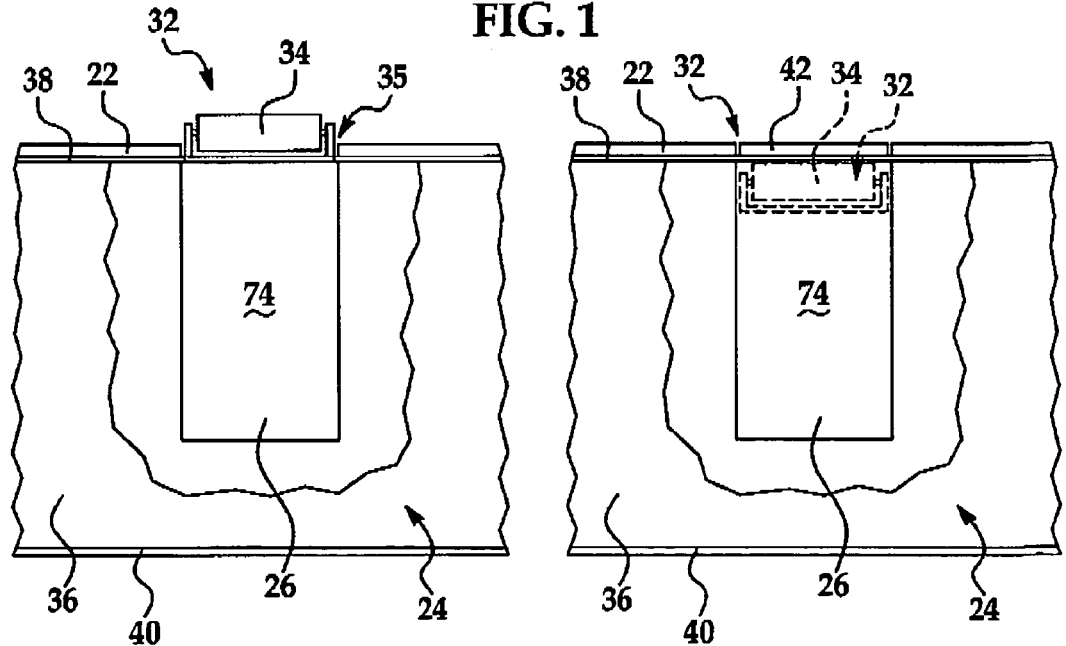
FIG. 2 is a sectional view of the cargo floor system, illustrating a roller module in which the roller is extended above the floor.
FIG. 3 is an illustration similar to FIG. 2 but showing the roller having been retracted and a cover installed over an opening in the floor.
Figure 4:
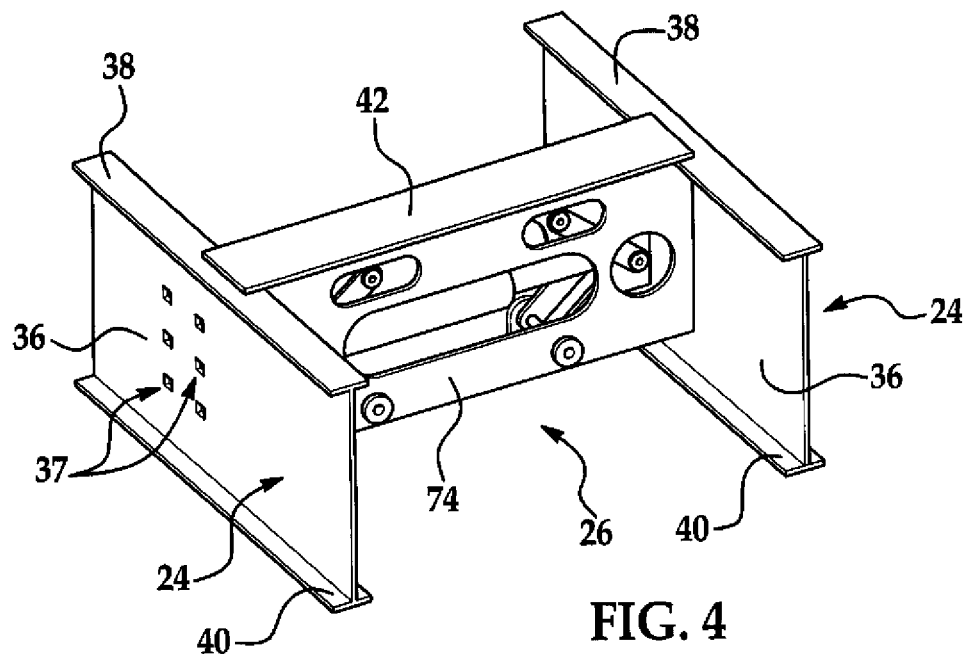
FIG. 4 is a perspective illustration showing a roller module mounted on two adjacent floor beams.
Figure 5:
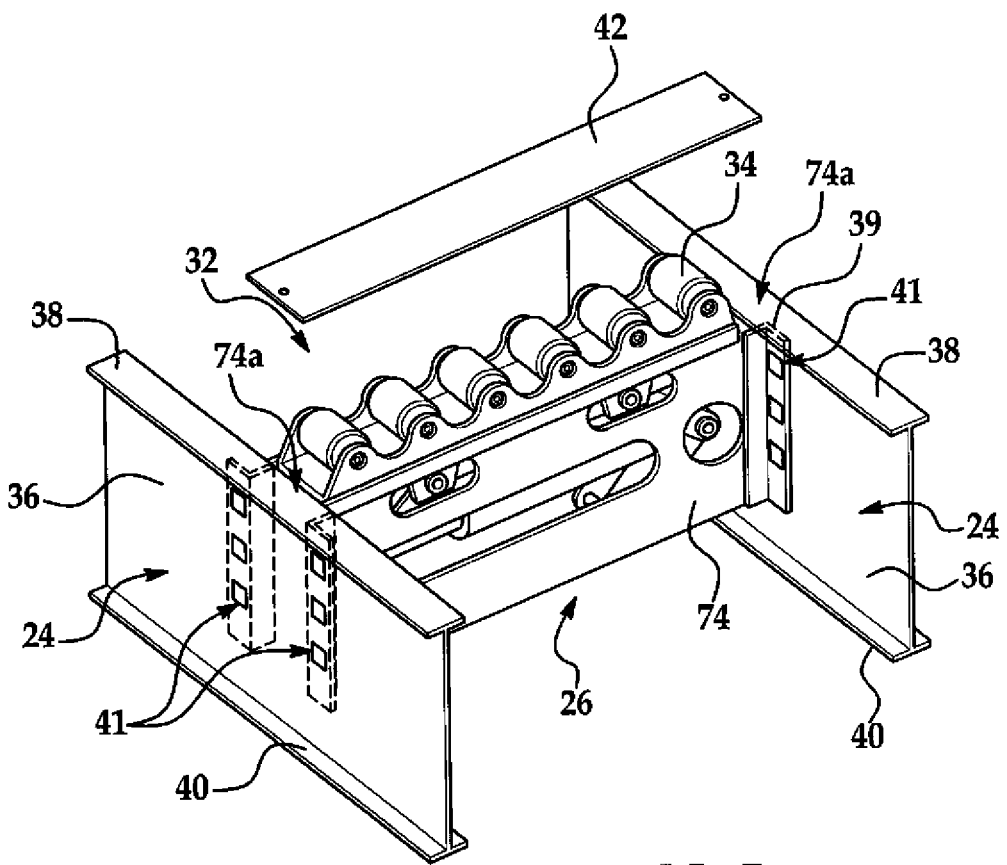
FIG. 5 is a view similar to FIG. 4 but showing the cover elevated to reveal a roller assembly.

Each of the roller modules 26 includes a generally rectangular housing 74 having its opposite ends secured on the webs 36 of adjacent beams 24. In the embodiment shown in FIG. 4, the housing 74 is attached to the web 24 by means of fasteners (not shown) that pass through the web 24 into the housing 74 at the locations designated by the arrows 37. Alternatively, as shown in FIG. 5, the housing 74 may be attached to the web 24 by means of brackets 39 secured to the web 24 by any suitable means such as fasteners, adhesives or weldments at the locations indicated at 41. The caps 38 of the beams 24 overlie and may be secured to a portion 74a of the housing 74, as shown in FIG. 5. Each of the modules 26 includes a roller assembly 32 including one or more rollers 34 which may be extended through the floor openings 35 to a position above the floor, as shown in FIG. 2 where the roller may engage and support cargo (not shown). In order to provide a smooth cargo floor surface, substantially free of obstructions, the roller assemblies 32 may be retracted through the floor openings 35 to a position beneath the floor 22, as shown in FIG. 3, using roller shifting means that will be described below. Following retraction of the roller assembly 32, a cover 42 may be placed over the opening 35, as shown in FIGS. 3 and 4. The cover 42 may be locked in place by a quick release lock or CAMLOC type fastener (not shown) at each end of the cover 42.

Figure 6:
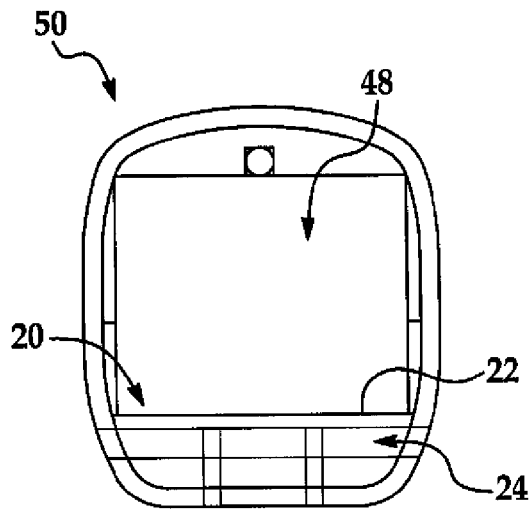
FIG. 6 is a cross sectional illustration of an aircraft fuselage having a cargo area.
Figure 7:
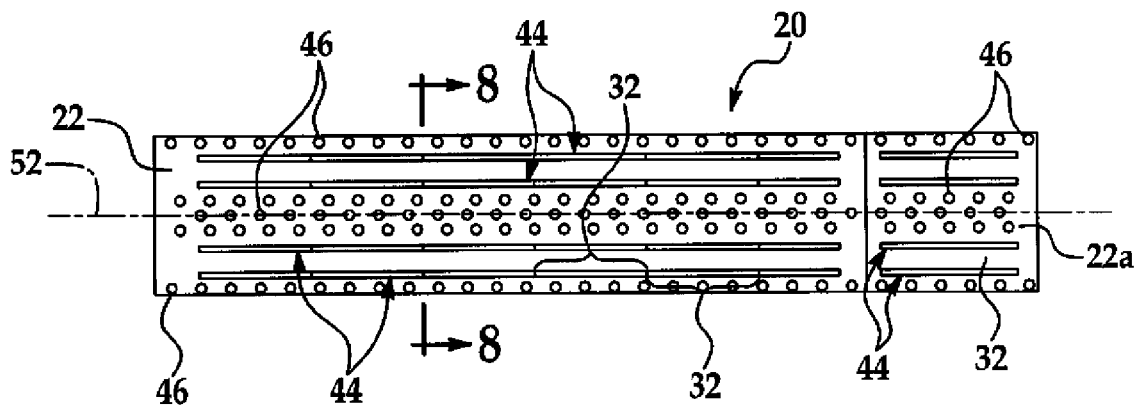
FIG. 7 is a plan view illustrating a cargo floor system suitable for use in the aircraft fuselage shown in FIG. 6.
Figure 8:
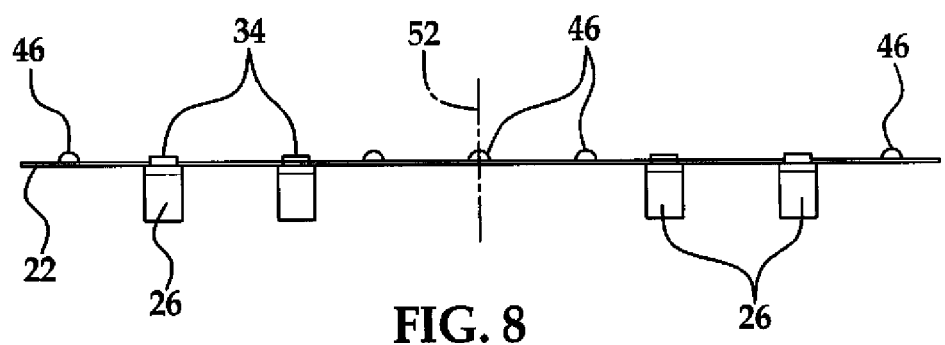
FIG. 8 is a sectional view taken along the line 8-8 in FIG. 7.

FIG. 6 illustrates a typical application of the cargo floor system 20. An aircraft fuselage 50 includes a cargo area 48 having a cargo floor 22 supported by floor beams 24. FIGS. 7 and 8 illustrate one possible configuration of the cargo floor system 20 that may be used in the cargo area 48 shown in FIG. 6. The floor system 20 includes a substantially flat floor 22 formed of metal or other rigid materials in which a plurality of the roller modules 26 are arranged in end-to-end relationship forming four parallel lines of roller assemblies 32. Cargo tie-downs 46 may be attached to or may be formed integral with the floor 22, and are positioned on each side of the lines of roller assemblies 32 in order to provide a means of attaching tie down straps (not shown) to the floor 22. In the illustrated example, the roller modules 26 are aligned in end-to-end relationship to form the lines 44 and are equally spaced on opposite sides of the centerline 52 of the floor 22. Numerous other configurations are possible, however. If desired, a removable or foldable ramp 22a may be connected to the cargo floor 22 to facilitate cargo loading. The ramp 22a may include roller modules 26 that are aligned such that the corresponding roller assemblies 32 are aligned with those on the floor 22.

Figure 9:
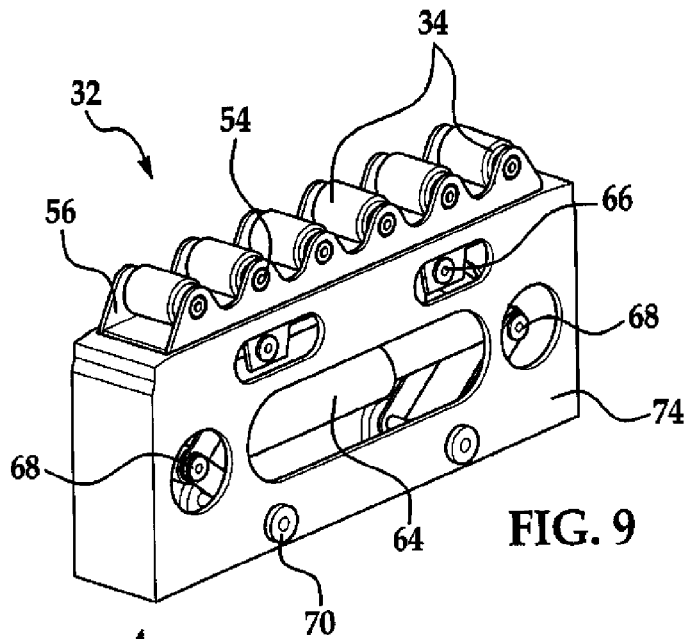
FIG. 9 is a perspective illustration of a roller module.
Figure 10:
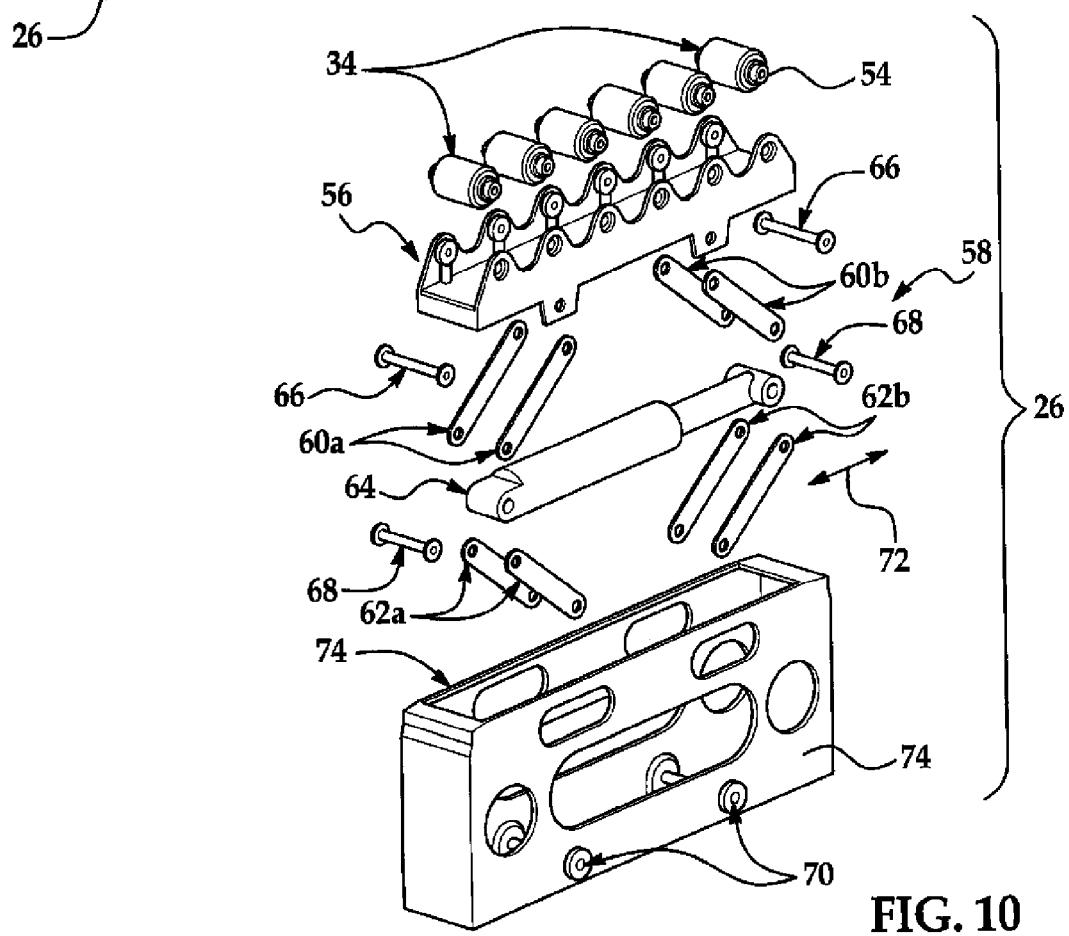
FIG. 10 is a perspective, exploded illustration of the roller module shown in FIG. 9.

Attention is now directed to FIGS. 9 and 10 which illustrate further details of the roller modules 26. FIG. 9 depicts the roller assembly 32 in a retracted position disposed immediately above the module housing 74, however it is possible that the roller assembly 32 may be fully recessed within the housing 74 in some embodiments. The roller assembly 32 includes an elongate roller carrier 56 upon which a plurality of rollers 34 are mounted by means of individual bolts 54. While bi-directional rollers 34 are illustrated in FIGS. 9 and 10, other types of roller configurations are possible, as will be discussed below. Exchange or replacement of any of the rollers 34 requires only the removal of an individual bolt 54.

First and second pairs of arms 60a, 60b are connected to the roller carrier 56 by pivot pins 66. The roller carrier 56 may be exchanged or replaced simply by removing the two pins 66, and thus does not require removal of the entire housing 26. The arms 60a, 60b are also connected by pivot pins 66 respectively to the opposite ends of extendable, hydraulic cylinder 64. The opposite ends of the hydraulic cylinder 64 are connected to the housing 74 by means of two pairs of arms 62a, 62b and pivot pins 68 and 70. The arms 60a, 60b, 62a, 62b along with the hydraulic cylinder 64 form a scissors assembly 58 that is powered by the hydraulic cylinder 64. The scissor assembly 58, hydraulic cylinder 64 and roller carrier 56 form a mechanism that may be removed as a single assembly for repair or replacement simply by removing the pivot pins 70. The hydraulic cylinder 64 comprises a motor means, which when extended, causes the scissors assembly 58 to collapse within the housing 74, thereby retracting the roller assembly 32. Conversely, retraction of the hydraulic cylinder 74 causes the scissors assembly 58 to extend, thereby, extending the roller assembly 32 so that the rollers 34 pass through the openings 35 (FIGS. 2 and 3) to position above the floor 22.

Following use of the rollers 34 to move cargo across the floor 22, the rollers 34 may be retracted to allow the cargo to rest on the floor 22, thereby providing a more stable footing for the cargo. Tie down straps (not shown) do not force additional weight onto the roller system since it has been retracted.

Figure 11:
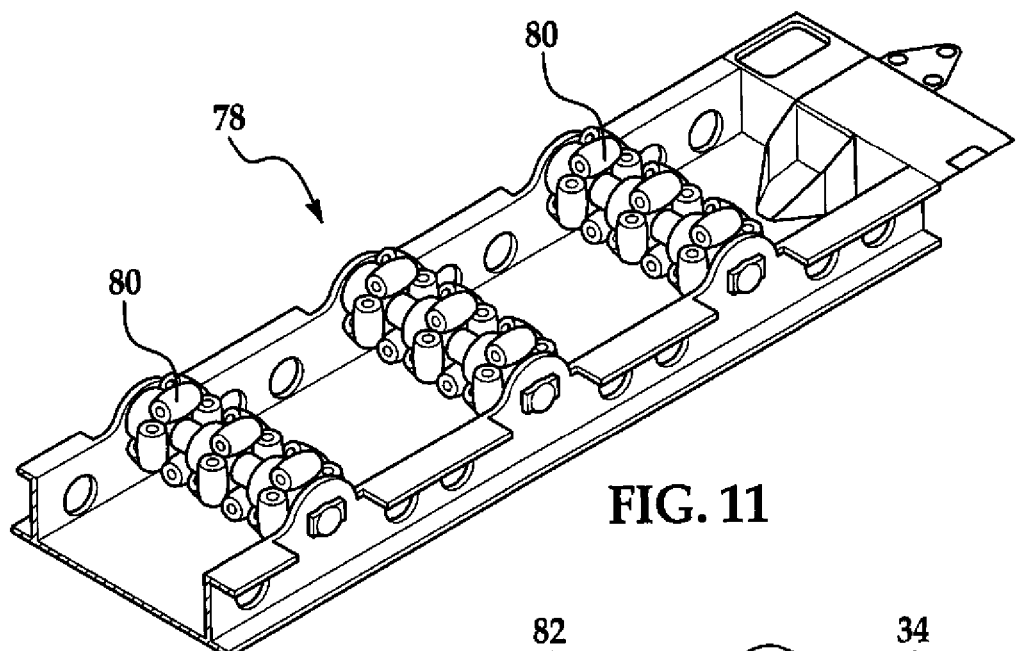
FIG. 11 is a perspective view of an alternate form of roller assembly.
Figure 12:
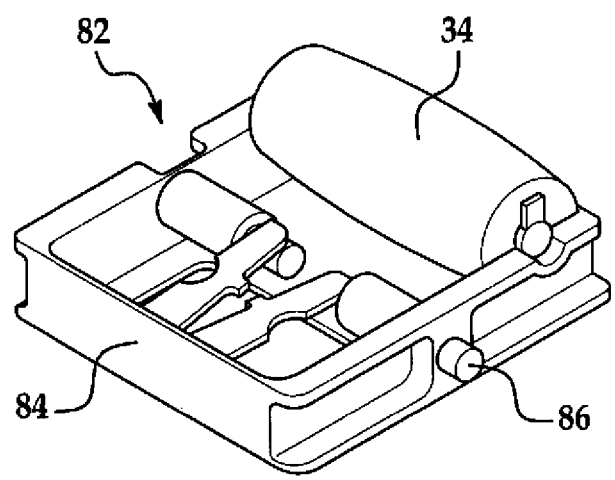
FIG. 12 is a perspective illustration of another form of a roller assembly.

FIG. 11 illustrates an alternate form of a roller assembly 78 having multiple sets of omni-directional rollers 80 that may be employed in the roller modules 26. A further embodiment of a roller assembly 82 that may be used in connection with the roller module 26 is illustrated in FIG. 12 wherein a bi-directional roller 34 is mounted on a carrier 84 that may pivot about an axle 86. Pivotal mounting of the carrier 84 allows the roller 34 to "tip" in order to facilitate certain cargo movements that may be inclined, such as along an edge (not shown) of the cargo floor 22.

Figure 13:
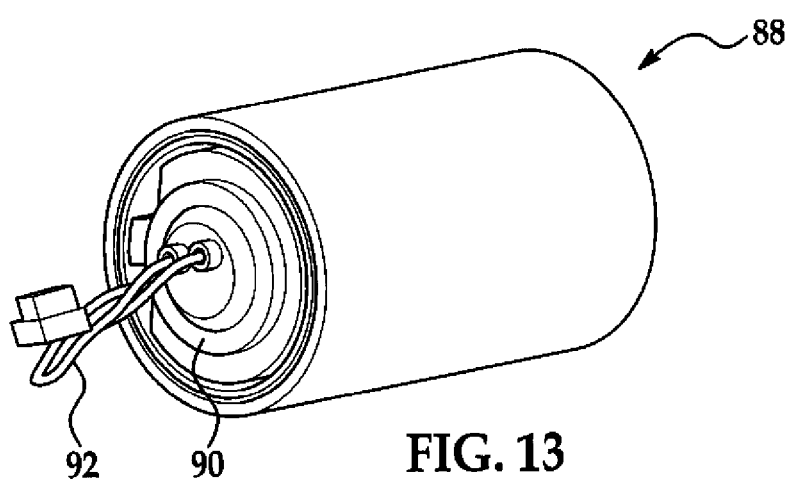
FIG. 13 is a perspective illustration of a powered roller.

FIG. 13 illustrates a motorized roller 88 that may be used in roller modules 26. The motorized roller 88 may include an electric motor hub 90 having electrical connections 92 coupled with a source of electrical power (not shown) that powers the motor 90 which drives the roller 88.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A retractable roller module for a cargo floor, comprising:
   a housing;
   at least one roller for engaging cargo on the floor; and,
   a scissors mechanism mounting the roller on the housing for shifting movement between an extended position in which the roller extends above the floor for engaging cargo, and a retracted position in which the roller is disposed below the floor.

2. The retractable roller module of claim 1, wherein the roller and the scissors mechanism are disposed within the housing when the roller is in its retracted position.

3. The retractable roller module of claim 1, wherein the scissors mechanism includes:
   arms forming a scissors assembly, and
   a motor connected to the arms for displacing the scissors assembly.

4. The retractable roller module of claim 3, wherein:
   the motor is a hydraulic cylinder having first and second ends, and
   certain of the arms are pivotally connected to the first and second ends of the hydraulic cylinder.

5. The retractable roller module of claim 1, wherein the scissors mechanism includes:
   a carrier, the roller being mounted on the carrier,
   an extendable scissors assembly mounting the carrier on the housing, and
   a motor connected with the scissors assembly for extending and retracting the scissors assembly.

6. The retractable roller module of claim 1, wherein the scissors mechanism includes a carrier, and the module includes a plurality of the rollers mounted for rotation on the carrier and aligned along a direction of travel of the cargo over the floor.

7. The retractable roller module of claim 1, wherein:
   the scissors mechanism includes extendable arms, and
   the carrier is removably mounted on the arms.

8. A roller module for use in a cargo floor, comprising:
   at least one roller for engaging cargo; and,
   scissors means for shifting the roller between a retracted position disposed beneath the floor and an extended cargo engaging position disposed above the floor.

9. The roller module of claim 8, further comprising:
   a housing, and
   wherein the roller shifting means is mounted within the housing.

10. The roller module of claim 8, further comprising:
    a plurality of rollers for engaging the cargo; and
    a carrier on which the rollers are mounted.

11. The roller module of claim 10, wherein the roller shifting scissors means includes a set of arms connecting the carrier with the housing.

12. The roller module of claim 11, wherein the roller shifting scissors means includes motor coupled with the arms for displacing the arms.

13. The roller module of claim 12, wherein:
    the motor includes a fluid driven extendable cylinder, and
    the arms are connected to opposite ends of the extendable cylinder.

14. The roller module of claim 8, wherein the roller shifting scissors means includes:
    a carrier for carrying the roller,
    an extendable scissors assembly connected with the carrier, and
    a motor connected with the scissors assembly for extending and retracting the scissors assembly.

15. A cargo floor system for aircraft, comprising:
    a floor;
    openings in the floor; and,
    a plurality of roller modules beneath the floor and each aligned with one of the openings in the floor, each of the roller modules including a scissors mechanism and at least one roller extendable into engagement with the cargo and retractable beneath the floor.

16. The cargo floor system for aircraft of claim 15, further comprising:
    beams beneath the floor for supporting the floor, and
    wherein the modules are supported by the beams.

17. The cargo floor system for aircraft of claim 16, wherein:
    the beams extend generally parallel to each other and each include a web extending generally transverse to the floor, and
    each of the roller modules has opposite ends respectively mounted on the webs of adjacent ones of the beams.

18. The cargo floor system for aircraft of claim 16, wherein:
    the beams extend generally parallel to each other and each include a web extending generally transverse to the floor, and
    each of the roller modules has opposite ends respectively mounted on the webs of adjacent ones of the beams.

19. The cargo floor system for aircraft of claim 15, further comprising:
    a plurality of covers for respectively covering the openings when the rollers are retracted beneath the floor.

20. The cargo floor system for aircraft of claim 16, further comprising:
    means for removably mounting opposite ends of the roller modules on adjacent ones of the beams.

21. The cargo floor system for aircraft of claim 15, wherein each of the roller modules includes:
    a plurality of rollers for engaging the cargo, and
    a carrier on which the rollers are mounted.

22. The cargo floor system for aircraft of claim 15, wherein each of the roller modules includes:
    a housing, and,
    a scissors mechanism mounting the roller on the housing for shifting movement between the extended and retracted positions.

23. The cargo floor system for aircraft of claim 22 wherein the mechanism includes:
    arms forming a scissors assembly, and
    a motor connected to the arms for displacing the scissors.

24. The cargo floor system for aircraft of claim 23, wherein:
    the motor is a hydraulic cylinder having first and second ends, and
    certain of the arms are pivotally connected to the first and second ends of the hydraulic cylinder.

25. The cargo floor system for aircraft of claim 22 wherein the mechanism includes:
    a carrier, the roller being mounted on the an extendable scissors assembly mounting the carrier on the housing, and a motor connected with the scissors assembly for extending and retracting the scissors assembly.

26. The cargo floor system for aircraft of claim 22, wherein the scissors mechanism includes a carrier, and
the module includes a plurality of the rollers mounted for rotation on the carrier and aligned along a direction of travel of the cargo over the floor.

27. A method for moving cargo on a cargo floor within a vehicle, comprising:
providing a roller module for said cargo floor;
operating said roller module by a scissoring mechanism from a retracted position to an extended position in which at least one roller extends above said cargo floor of said vehicle; and
positioning said cargo by engaging said roller to move the cargo within said vehicle over the roller module.

28. The method for moving cargo within a vehicle according to claim 27 further comprising the step of disposing said at least one roller and said scissors mechanism within a roller module housing when said at least one roller is in its retracted position.

29. The method for moving cargo within a vehicle according to claim 27 further comprising the step of forming said scissors mechanism by a plurality of arms.

30. The method for moving cargo within a vehicle according to claim 29 further comprising the step of connecting a motor to said plurality of arms for operating said scissors mechanism.

31. The method for moving cargo within a vehicle according to claim 30 further comprising the step of connecting a hydraulic cylinder as said motor to pivotally operating at least certain of said plurality of arms.

32. The method for moving cargo within a vehicle according to claim 27, further comprising the steps of:
mounting said roller module on a carrier;
mounting said carrier on said scissors mechanism; and
connecting a motor to said scissors mechanism to extend and retract the scissors mechanism.

33. The method for moving cargo within a vehicle according to claim 27 further comprising the step of:
providing extendable arms for said scissors mechanism, and
removably mounting said carrier on said extendable arms.

34. The method for moving cargo within a vehicle according to claim 27 further comprising the step of operating said scissors mechanism for shifting said at least one roller between a retracted position disposed beneath the cargo floor and an extended cargo-engaging position disposed above the cargo floor.

35. A method for moving cargo on a cargo floor within a vehicle, comprising:
providing a roller module for said cargo floor;
operating said roller module by a scissoring mechanism from a retracted position to an extended position in which at least one roller extends above said cargo floor of said vehicle;
disposing said at least one roller in said scissors mechanism within a roller module housing when said at least one roller is in its retracted position;
connecting a hydraulic cylinder to a plurality of arms forming said scissors mechanism;
aligning said at least one roller in a direction of travel of said cargo over the cargo floor;
providing extendable arms for said scissors mechanism; and
positioning said cargo by engaging said at least one roller to move the cargo within said vehicle over the roller module.

* * * * *